Jan. 14, 1936.   G. G. WALKER   2,028,096
WELDED METAL PIPE AND PROCESS OF MAKING SAME
Filed Oct. 28, 1935   2 Sheets-Sheet 2

Inventor
GEORGE G. WALKER.
By Richey & Watts
Attorney

Patented Jan. 14, 1936

2,028,096

UNITED STATES PATENT OFFICE 2,028,096

WELDED METAL PIPE AND PROCESS OF MAKING SAME

George G. Walker, Poland, Ohio, assignor to Republic Steel Corporation, Youngstown, Ohio, a corporation of New Jersey Application October 28, 1935, Serial No. 47,047

35 Claims. (Cl. 219—10)

This invention relates to the art of butt welded ferrous metal pipe and tubing and is particularly concerned with electric resistance butt welded, high tensile, ferrous metal pipe and tubing and with new and improved electric resistance methods of making both low and high tensile ferrous metal pipe and tubing.

Ferrous metal pipe and tubing for use under severe service conditions has not been made heretofore by electric welding processes, so far as I am aware. For example, pipe for use as oil well casing in the deeper fields has heretofore been made by the so-called "seamless" or "piercing" process.

I have discovered that high tensile steel pipe can be made by electric resistance butt welding methods, and particularly by edge welding methods, and I have made pipe of new and improved properties and characteristics which fits it for many uses and particularly for such severe uses as casings for the deeper oil wells. Such pipe may be made with smooth inner and outer surfaces, and a longitudinal edge surface weld of substantial uniformity for its full radial length. The physical properties of such pipe may be brought within the current specifications of even Grade C and Grade D pipe of the American Petroleum Institute. Such pipe, embodying the present invention, has a ductility of about 35% elongation in 2", a yield point at about 80% of the tensile strength and a tensile strength of above about 75,000 lbs. per sq. in. of metal. When it is to meet Grade D specifications, its ductility is above about 25% elongation in 2", its tensile strength is above about 95,000 lbs. per sq. in. in a heat treated condition and its yield point is in excess of about 70% of the tensile strength. The ductility and yield point values of these pipes are superior to the corresponding values of present day, so-called "seamless" pipe of the same grades. The present Grade D specifications of the A. P. I. are as follows: minimum tensile strength, 95,000 pounds per square inch, minimum yield point 55,000 pounds per square inch, minimum elongation, 18% in 2 inches.

A steel particularly well suited for welding into pipe to meet Grade C specifications is one containing from about .18% to about .24% of carbon, from about .80% to about 1.30% or more of manganese, from about .015% to about .020% of phosphorous, substantially no silicon and about .50% of copper, when "killed" with aluminum in amounts sufficient to leave, at most, only a trace of aluminum in the steel, for example by adding about 25 to 50 lbs. of aluminum per ton of steel.

If pipe is made from such metal according to the method herein described it will possess the above stated properties. In addition, it will have high torsional strength, it will be stiff and rigid as compared with low carbon steel and, when threaded, will have extremely high "pull out" strength in the threads, that is, resistance by the threads to longitudinal pull exerted on the pipe. Its resistance to collapse is very high both because of the composition and the uniformity in wall thickness.

Substantially the same physical properties and characteristics as those stated above may also be obtained as by cold working a steel of the foregoing composition which however contains about .16% of carbon and about 1.38% of manganese instead of the above stated range of these elements.

If the first stated composition is varied as to carbon and manganese so that the carbon ranges from about .35% to about .45% or more and the manganese ranges from about 1.30% to about 1.70% or more, the steel pipe made therefrom by the present invention will meet the specifications of Grade D pipe even after normalizing, which slightly reduces the ultimate strength and yield point values.

I have found that the present invention makes it possible to produce pipe which will meet the Grade C specifications of the A. P. I. and which differs somewhat in composition and treatment from that of the pipe just described. I have found that if steel containing from about .18% to about .24% of carbon, from about .90% to about 1.10% of manganese, from about .95% to about 1.05% of copper, with from about .015% to about .020% of phosphorous and substantially no silicon, is "killed" as previously described, then hot rolled to flat shapes suitable for pipe blanks, then cold formed into pipe blanks and electric resistance welded according to the present invention, the resulting pipe will have a tensile strength of between about 85,000 pounds and 90,000 pounds per square inch of metal, a yield point between about 65,000 pounds and 70,000 pounds per square inch of metal, and an elongation of about 30% in 2 inches. If such a pipe be heat treated by being held or soaked for from about ten minutes to about fifteen minutes at between about 900° F. and about 1,000° F., and then air cooled, the tensile strength will be between about 95,000 pounds and 100,000 pounds per square inch of metal, the yield point will be between about 75,000 and 80,000 pounds per square inch of metal, and the elongation will be increased between about 10% and about 20%. Since these physical properties of the pipe are traceable to several factors, including the steel composition, the cold working and the heat treatment, the blank may be electric welded by methods other than the resistance method without material change of these physical properties, but I believe that the physical properties obtained by gas welding would be considerably lower than those just stated. Accordingly, I prefer to use the electric resistance butt welding method, but may use other electric welding methods in producing this pipe.

I have also found that by the present invention it is possible to make tubing with exceptionally high physical properties and characteristics. I have found that if steel containing between about .10% and about .15% carbon, between about .70% and about .90% of manganese, between about .70% and about .90% copper, between about .015 and .020 phosphorous and substantially no silicon, is "killed" as described above, is then hot rolled into flat shape suitable for pipe blanks, then cold formed into pipe blanks and then electric resistance butt welded, the resulting pipe will have a minimum tensile strength of about 75,000 pounds per square inch of metal, a minimum yield point of about 45,000 pounds per square inch of metal, with an average of about 66,000 pounds per square inch of metal, and will have a ductility of about 25% elongation in 2 inches. If such a pipe be heat treated by being held or soaked for from about ten minutes to about 15 minutes at temperature of between about 900° F., and about 1,000° F., and then air cooled, its tensile strength will be increased from about 10% to about 12%, its yield point will be increased from between about 5% to about 8% and its ductility will be increased from about 10% to about 20%. Tubing of this analysis, with or without the heat treatment, will meet the present Grade C specifications of the A. P. I.

In the case of this tubing, as in the case of Grade D pipe, mentioned in the preceding paragraph, while I prefer to use the electric resistance butt welding method of forming the seam, much the same physical properties may be obtained if other electric welding methods are employed, but I believe that gas welding methods would not result in pipe having substantially the foregoing properties.

Heretofore, considerable difficulty has been encountered in making edge surface welds in heavy gage, ferrous metal pipe and tubing, even with a low carbon content in the steel, and the difficulties increased or became prohibitive with higher carbon or "high tensile" steels. This difficulty consisted mainly in the inabiltiy to weld the seam edge surfaces together uniformly for their full radial lengths. This difficulty has been largely overcome in low carbon steel pipe and tubing by the inventions of Herman G. Blevins and Frank W. Cramer presently to be described.

The terms "edge surface welding" and "edge surface welds", as employed herein, refers to the character of weld produced by the general method of welding described in the Johnston Patents Nos. 1,388,434 and 1,435,306, wherein welding current, welding pressure, and speed of travel of the tubing were so correlated as to result in the weld which has been characterized by the Third Circuit Court of Appeals in the case of Steel & Tubes v. The General Tube Company as being an edge surface weld.

The copending application of Herman G. Blevins, Serial No. 550,906, filed July 15, 1931, now Patent No. 1,982,415 discloses and claims, among other things, the invention of cold working the seam edges of a ferrous metal pipe or tube preparatory to welding. The copending application of Frank Cramer, Serial No. 576,260, filed November 20, 1931, now Patent No. 2,016,414 discloses and claims, among other things, the invention of applying current to metal pipe and tubing in such areas as to insure a flow of welding current across the seam for its full radial length to facilitate the welding of all parts of the abutting edge surfaces to each other.

Commercial use of these inventions has proven that they are useful and valuable, but difficulties have been encountered in attempts to employ them with steel pipe blanks of certain recently adopted sizes and compositions. In other words, with low tensile steels in excess of about ⅜" in thickness and with high tensile steels, it has been extremely difficult to produce satisfactory edge surface welds even when using those inventions.

As a result of study, investigation and experiment, I have discovered how to avoid the prior welding difficulties and have devised a method by which resistance edge surface welds may be made uniform for the full radial length of the seam edges in steels containing considerable amounts of carbon and in high tensile steels. This method is quite satisfactory on high tensile and on low carbon steels and regardless of thickness of the metal. By this method, edge surface welds may be made uniform for the full radial length of the seam edges in a wide range of wall thickness from very thin walls to walls $\frac{3}{8}$" thick or more, and in a wide range of metal composition from very low carbon steel to steels difficult to weld, including high tensile steels containing .45% of carbon or more and 1.70% of manganese or more.

This method consists of certain old steps, improvements of steps of the Blevins and the Cramer inventions, and certain new steps. It may be said to include the following principal steps: Forming a pipe blank with a longitudinal seam, the opposed edge surfaces of which first contact at or near to the outer surface of the blank and diverge therefrom to the inner surface of the blank when the blank is ready for welding, and, edge surface welding the opposed edges together progressively from their points of first contact to their radial ends.

Additional steps, some of which are quite important under certain circumstances, are as follows: Preparing a suitable steel composition and suitably treating it, cold upsetting or thickening the seam edge portions of the blank, and applying welding current to the blank in such a manner as to insure substantially equal curent flow across all parts of the seam under similar conditions of contact and temperature.

In practicing the present process, the steps of preparing and treating the metal to be welded should be considered first. When a low carbon steel pipe or tube is desired, either ordinary low carbon "rimmed" or "killed" steel may be used. If a high tensile steel pipe or tube is desired, it is important that the composition be properly selected and suitably treated. The carbon content may range from .10% to .45% or more, the manganese may range from about .70% up to 1.70% or more, but regardless of what other ingredients are present, the silicon should be kept as low as possible and the phosphorous should be kept below about .020% or thereabouts. I prefer to have at least about .50% of copper in the steel and, for certain purposes, have between about .70% and about 1.05% as above noted.

According to the present invention, I prefer to employ steel which has been "killed" with aluminum, although such killing is important mainly with steels which may be termed "high tensile steels", such as those containing considerable quantities of carbon, for example from about .18% to about .45% or more, and manganese for example from about .80% to about 1.70% or more. The amount of aluminum used to kill the steel should not be much in excess of that actually required for the killing action and preferably should not be quite sufficient for complete killing since there should remain in the steel at the time of welding, at most, only traces of aluminum. Ingots poured from such metal may be hot rolled into plates or strip for welding and the plates or strip may additionally be cold rolled if desired. Such plates or strip are usually sheared along the edges to bring them to the proper width and to provide clean edge surfaces for welding and are then cold formed into pipe blanks.

The step of shaping the pipe blank and the opposed seam edges is particularly important with high tensile steels, but it is advantageous with the simple or low carbon steels. This step is preferably performed while the flat metal is being formed into a pipe blank, although it may be done after the blank is formed and just prior to welding. This step may be readily visualized by assuming that it consists of two parts, namely, the forming of the blank into an oval cross sectional shape with the longer axis in line with the seam, and the shaping of the seam edge surfaces so that they will diverge toward their radial ends from their point of initial contact when the pipe is in the shape desired for welding. In practice, these two parts are interrelated and are carried out at the same time. The blank is preferably formed into a cross sectional shape in which one-half is substantially semi-circular and the other half, that is, the half containing the seam, is slightly oval with the radius at the seam being greater than the radius of the semi-circular part and with the edge surfaces bearing against a fin so that the opposed edge surfaces of the seam are made substantially parallel while the blank is in the oval cross section just described. When so shaped, the edges will contact at or near to their outer radial extremities and diverge therefrom to their extremities where a predetermined definite clearance will be provided when the oval blank is changed to a more nearly circular form just before the welding begins.

This cross sectional shape possesses the advantage that the walls adjacent to the seam are more steeply inclined than they would be in a truly circular blank and hence resist more strongly the heavy welding pressure applied in the neighborhood of the seam and also resist any tendency to distortion of the metal during welding which might tend to cause an opening of the weld at its outer extremity after welding.

When this shaping of the edge surfaces is so accomplished the surfaces are freed from slivers, high spots and shearing inaccuracies, and the metal is compressed and densified. Preferably the shaping is so carried out that the metal back some little distance from the edge surfaces is upset and thickened. This thickening is of advantage in subsequent removal of the hot upset burr of the welded seam for it provides relatively cold metal projecting beyond the outer surface of the remainder of the pipe on either side of the welded metal. This cold metal can be cut away while the upset burr is still hot, leaving a clean surface across the seam which is a substantially true continuation of the cylindrical surface of the pipe.

The step of welding the seam is carried out on a blank formed and shaped as aforesaid and, in the case of high tensile steels, composed of metal prepared and treated as aforesaid. In this step the blank is of a slightly oval cross section, the major axis having been shortened somewhat but being longer than the minor axis, with the opposed edge surface contacting at or near the outer surface of the blank and diverging therefrom to their radial ends where they are separated a definite, though small, distance. While the welding pressure is being exerted on the blank, adequate current is supplied to the blank over circumferential areas which are so located that current can flow readily to any, or equally to every, point on the radial length of the seam. These areas include the points where a tangent to the inner surface of the pipe at the inner end of the seam intersects the outer surface of the pipe. Wide electrodes engaging with the pipe from points fairly close to the seam edges to points circumferentially beyond the said intersections of tangent and outer surface of the pipe are satisfactory.

When such electrodes are used with such a pipe blank, I believe the current first crosses the seam where the edge surfaces are first in contact, thereby heating the contacting points and increasing their resistance with resultant decrease in current flow therethru. The continued welding pressure forces such heated points closer together and brings other adjacent points into contact. The current thereupon flows through such points of contact. This action is repeated rapidly until the edge surfaces have been welded together with an edge surface weld for their full radial lengths. This action may be said to consist of a series of impulses of current each of which heats its particular part of the edge surfaces and all of which combined result in a uniform edge surface weld for the full radial length of the seam.

While I have described this operation as consisting of a plurality of repetitions of the welding of successive points, it may also be visualized as consisting of a steady flow of current, a continuous pressure and a progressive welding of the edges.

Immediately after the welding has been completed the hot welded metal and upset burr with the adjacent raised cold metal may be removed in any suitable manner, as by cutting. Then the pipe may be worked into a circular cross section, straightened and otherwise suitably treated for the desired use.

In the drawings accompanying and forming a part of this specification,

Figure 1:
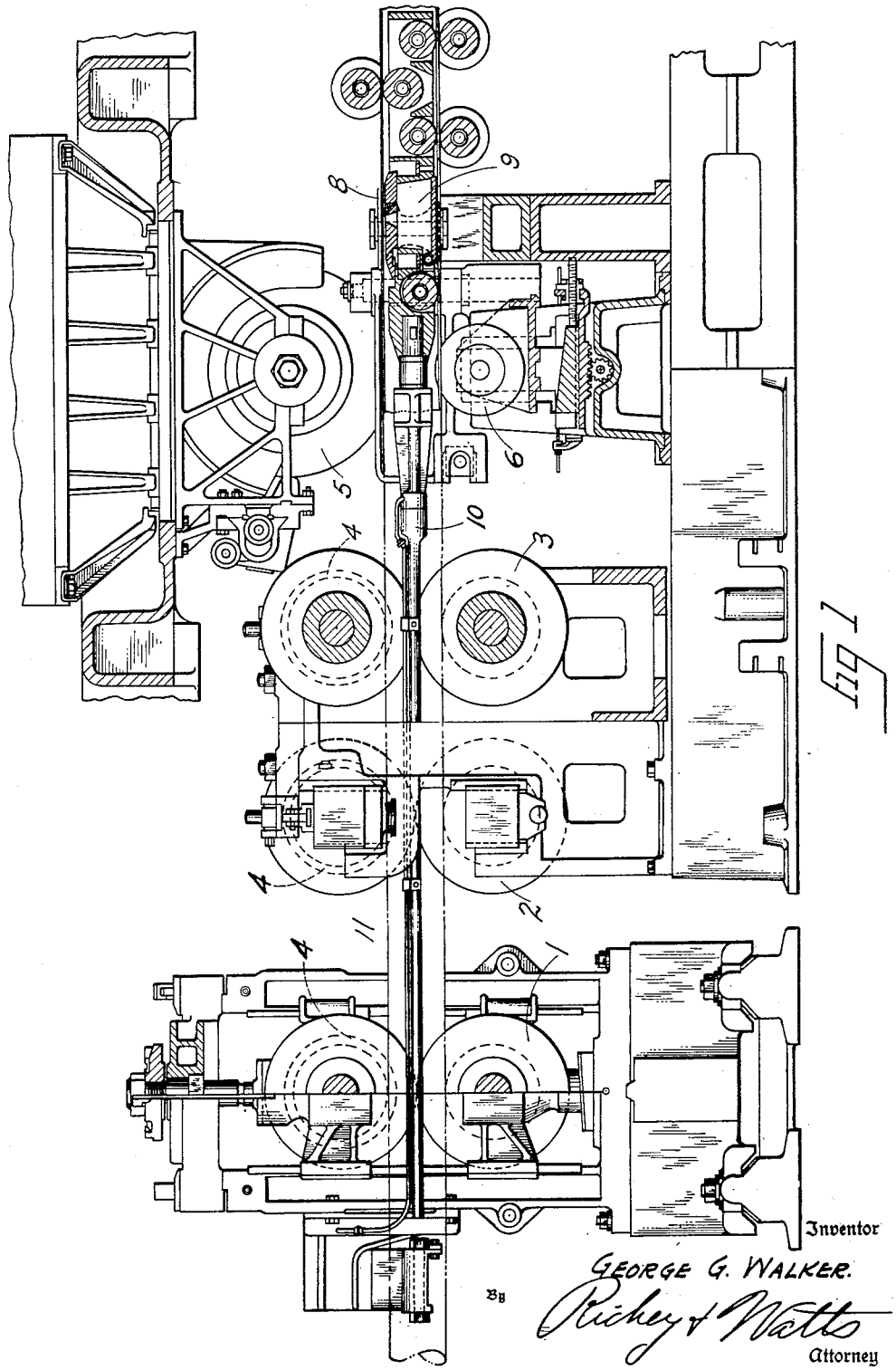
Figure 1 is a side elevation of one form of apparatus which may be used to practice the present invention.

Figure 1 shows three roll passes 1, 2 and 3, each provided with a fin roll or disc 4 which discs are similar but differ slightly in dimensions. Means (not shown) serve to move the pipe blank through roll passes 1, 2 and 3 and through the welding throat of the welding machine. This throat is formed by electrodes 5, bottom roll 6 and opposite side rolls 7 (Fig. 4), these parts being suitably contoured to maintain the desired distortion of the pipe blank during welding.

An outside burr remover 8 is positioned near the exit end of the welding throat to remove the flash and some parent metal immediately after the weld is formed. A flash remover which has proven satisfactory is described and claimed in the U. S. patent of H. C. Rippel, No. 1,969,579 issued August 7, 1934.

An inside burr remover 9 is carried by mandrel rod 10. A flash remover which has proven satisfactory for this purpose is described and claimed in the copending application of H. C. Rippel, Serial No. 12,471, filed March 22, 1935.

The remaining parts of the welder are substantially as described in the above identified Blevins application.

Figure 2:
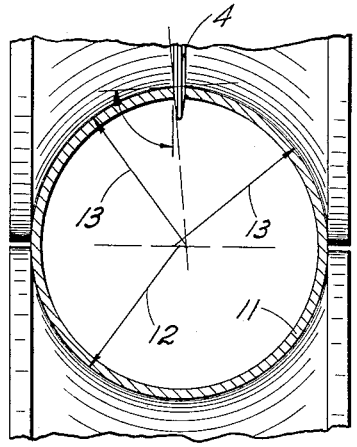
Figure 2 is a vertical sectional view taken through one of the several roll passes in which the pipe blank is formed and the edges shaped preparatory to welding.

Fig. 2 shows the rolls of pass 1 (Fig. 1). The bottom roll of pass 1 is contoured to receive approximately half of the pipe blank 11, the contoured surface being substantially a semicircle, having a radius 12 slightly larger than that desired in the welded pipe. For example, for a 14" O. D. pipe the radius of the contour in the bottom roll may be about 7 1/16". The upper roll which is contoured to receive approximately the other half of the blank, has a centrally disposed disc 4 to engage the seam edges of the blank 11. The contour surface of the upper roll is formed by two radii 13, each of a greater length than radius 12 and with their fixed ends located respectively on the horizontal center line of the blank and beyond the middle thereof. Radii 13 for a 14" O. D. pipe may for example be 7 13/16" with its fixed end on the horizontal axis of the blank about 3/4" from the fixed end of radius 12. Thus the contour of the upper roll is greater at its center than the radius of curvature of the lower roll and the vertical axis of the blank will be longer than the horizontal axis. Viewed from another standpoint, the upper or seam containing half of the pipe blank 11 will be distorted so that the vertical radius is lengthened and the sides are steeper and hence are able better to resist pressures exerted on the blank adjacent to the seam as compared with a truly circular blank or one having a larger horizontal than vertical axis. Thus the blank in pass 1 is oval in cross section with the long axis being in line with the seam.

The fin 4 has substantially parallel sides to engage the edge surfaces of the blank and converging surfaces at the periphery to clear those edges during entry into and removal from the blank. For pass 1 of a 14" O. D. mill the fin 4 may be about 11/16" thick between the parallel surfaces. A tangent to the outer surface of the blank at its point of contact with such a fin 4 will make an angle of about 81° 55' with the adjacent side of the fin. This fin will shape the seam edges into substantial parallelism while the blank is in pass 1.

Several passes, such as pass 1 just described, may be used, three of such passes having been found to be suitable and sufficient. It will be understood that in passes subsequent to pass 1 small changes in certain dimensions will occur. For example, the length of radii 13 may be decreased from 7 13/16" to about 7 5/8", the points about which they are swung being moved closer to the point about which radius 12 is swung, that is 1/2" as compared with 3/4", the thickness of the fin being decreased from about 11/16" to about 5/8", and the angles between the sides of the fin and tangents to the outer surface of the pipe where it contacts with the fins being increased to about 83° 10'. The fundamental purpose of these passes is to provide a pipe blank which, when ready for welding, is nearly circular in cross section with its longer axis extending through the seam, is slightly oversize in diameter, has edge surfaces contacting at or near their outer radial ends and diverging therefrom to define about a 12° included angle, has slightly thickened or upset metal adjacent to the seam edges and has walls on either side of the seam which are highly resistant to welding pressure.

Figure 3:
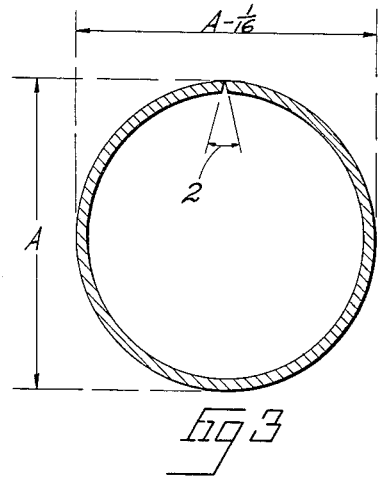
Figure 3 is a diagrammatic view showing the distortion of the pipe blank and the shape of the edge surfaces at the beginning of the welding operation.

When the blank is brought into the welding roll pass it has substantially the shape shown in Figure 3. It is still slightly oval with the longer axis extending through the seam when the edge surfaces are in initial contact. A 14" O. D. pipe may, for example, have a long axis A measuring about 14 3/8" and a short axis at right angles to axis A measuring about 14 1/8" (Fig. 3).

Figure 4:
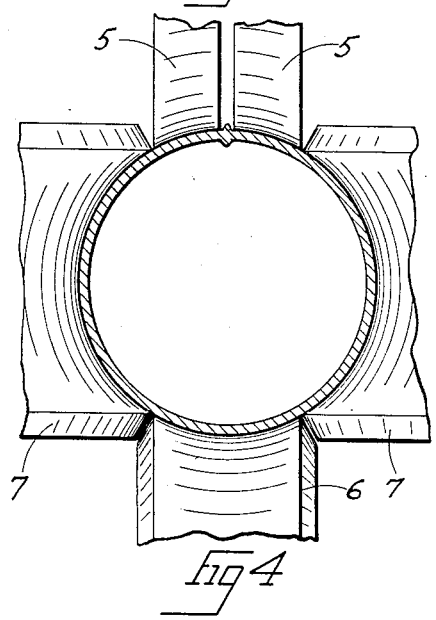
Figure 4 is a diagrammatic view showing the pipe at the completion of the welding operation and before the burrs have been removed.
Figure 5:
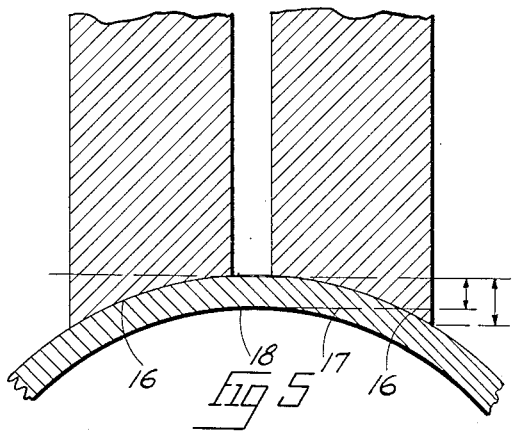
Figure 5 is a diagrammatic view showing the preferred relationship of electrodes and pipe blank during welding.
Figure 6:
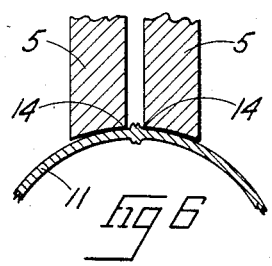
Figures 6 and 7 illustrate diagrammatically the initial relationship between the electrodes and pipe blanks which are stiff and relatively easily distorted, respectively.
Figure 7:
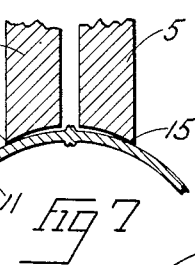

The throat of the welding machine of Fig. 1 is made up of electrodes 5, bottom roll 6 and side rolls 7. The side and bottom rolls are contoured to change the shape of the pipe blank to that of a circle as shown in Fig. 4, while electrodes 5 should be contoured in accordance with the stiffness of the pipe metal. For relatively stiff metal the toes 14 of the electrodes may bear most heavily as in Fig. 6, but for less stiff metal the heels 15 may bear most heavily as in Fig. 7, the contouring selected being such as will result in current conducting contact of the electrodes with the pipe for substantially their full width. The location and width of the electrodes is important, and, as shown in Fig. 5, is such that the electrodes encompass the points 16 where the outer surface of the pipe 11 intersects a line 17 tangent to the inner surface of the pipe at the inner end of the seam 18. The electrodes should extend to within a short distance of each other near the seam. For example, they may be spaced apart about 3/8" or more.

Figure 8:
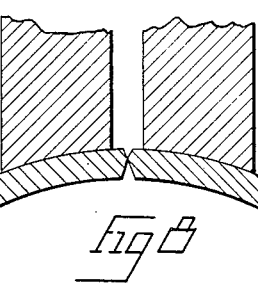
Figure 8 is a fragmentary enlarged view of a modified form of edge surfaces embodying the present invention.

In Fig. 8, I have shown a modified form of edge surface shaping wherein the surfaces initially contact intermediate their radial ends and diverge therefrom toward the inner and outer surfaces of the blank. This surface shaping is of advantage where the wall is quite thick or where very rapid welding is desired. This shaping of the edge surfaces may be accompanied by interrupting the fin working of the edges before they have been brought into parallelism for their full radial length. It will be understood that the edge surfaces initially converge toward each other from their outer to their inner radial ends when the pipe blank enters pass 1, and that the fins 4 work the edges into parallelism progressively from the inner ends outwardly. Hence, if the working action is interrupted before complete parallelism is accomplished each edge surface will consist of two oppositely inclined parts extending from a high point toward the inner and outer surfaces of the blank as shown in Fig. 8.

While it is important that the edge surface should definitely diverge as above described, it is important that the spacing between them at the time of welding should not be excessive. The edges should be so spaced that all points thereof can be quickly brought into contact as the welding proceeds. A space too wide would obviously retard or prevent welding. In edge surface welding only a thin layer or film of the metal is heated to welding temperature and hence there is but little opportunity for circumferential contraction of the blank. Large gaps between the edge surfaces thus cannot be closed if an edge surface weld is made. The amount of spacing will depend on the type and speed of welding and on the thickness of the metal to be welded. For edge surface welding the spacing should not exceed a very small fraction of an inch, such as 1/32" or possibly 1/64" in heavy metal and less in lighter metal. For example, spacing at the inner radial end of a seam in metal up to ½" thick to be edge surface welded, which has proven satisfactory, is that included within an angle of 12° to 14°, which amounts to a few thousandths of an inch.

While I have specifically described my invention in connection with edge surface welding, there are certain features of it which are capable of wider application and use. For example, the shaping of the edges so that parts thereof will be spaced as described may, I believe, be advantageously employed in pipe blanks to be welded by methods such as the standard furnace or hot method for example. Other features may similarly have wide application. Accordingly it is my intention that the scope of the present invention shall be defined by what is claimed.

This application is a continuation in part of my copending application Serial No. 750,907, filed October 31, 1934.

I claim:

1. A ferrous metal pipe having a longitudinal resistance butt weld, a tensile strength in excess of about 75,000 pounds per square inch of metal and containing between about .18% and about .45% of carbon, between about .80% and about 1.70% of manganese, between about .015% and about .020% of phosphorous and substantially no silicon.

2. A ferrous metal pipe having a longitudinal edge surface weld, a tensile strength of above about 75,000 pounds per square inch of metal and containing between about .18% and about .24% of carbon, between about .80% and about 1.3% of manganese, between about .015% and about .020% of phosphorous and substantially no silicon.

3. A ferrous metal pipe having a longitudinal edge surface weld, a tensile strength of above about 95,000 pounds per square inch in a heat treated condition, and containing between about .35% and about .45% of carbon, between about 1.30% and about 1.70% of manganese, between about .015% and about .020% of phosphorous and substantially no silicon.

4. A ferrous metal pipe having a longitudinal resistance butt weld, a yield point in excess of about 70% of the tensile strength and containing between about .18% and about .45% of carbon, between about .80% and about 1.70% of manganese, between about .015% and about .020% of phosphorous and substantially no silicon.

5. A ferrous metal pipe having a longitudinal edge surface weld, a yield point in excess of about 80% of the tensile strength and containing between about .18% and about .24% of carbon, between about .80% and about 1.30% of manganese, between about .015% and about .020% of phosphorous and substantially no silicon.

6. A ferrous metal pipe having a longitudinal edge surface weld, a yield point in the heat-treated condition of above about 70% of the tensile strength, and containing between about .35% and about .45% of carbon, between about 1.30% and 1.70% of manganese, between about .015% and about .020% of phosphorous and substantially no silicon.

7. A ferrous metal pipe having a longitudinal resistance butt weld, a tensile strength in excess of about 75,000 pounds per square inch of metal, a yield point in excess of about 70% of the tensile strength and containing between about .18% and .45% of carbon, between about .80% and about 1.70% manganese, between about .015% and about .020% of phosphorous and substantially no silicon.

8. A ferrous metal pipe having a longitudinal edge surface weld, a tensile strength of above about 75,000 pounds per square inch of metal, a yield point in excess of about 80% of the tensile strength and containing between about .18% and about .24% of carbon, between about .80% and about 1.3% of manganese, between about .015% and about .020% of phosphorous and substantially no silicon.

9. A ferrous metal pipe having a longitudinal edge surface weld, a tensile strength of above about 95,000 pounds per square inch in a heat-treated condition, a yield point in the heat-treated condition of above about 70% of the tensile strength and containing between about .35% and about .45% of carbon, between about 1.30% and 1.70% of manganese, between about .015% and about .020% of phosphorous and substantially no silicon.

10. A ferrous metal pipe having a longitudinal resistance butt weld, a tensile strength in excess of about 75,000 pounds per square inch of metal, a yield point in excess of about 70% of the tensile strength, a ductility of above about 25% elongation in 2", and containing between about .18% and .45% carbon, between about .80% and about 1.70% manganese, between about .015% and about .020% of phosphorous and substantially no silicon.

11. A ferrous metal pipe having a longitudinal edge surface weld, a tensile strength of above about 75,000 pounds per square inch of metal, a yield point in excess of about 80% of the tensile strength, a ductility of about 35% elongation in 2" and containing between about .18% and about .24% of carbon, between about .80% and about 1.3% of manganese, between about .015% and about .020% of phosphorous and substantially no silicon.

12. A ferrous metal pipe having a longitudinal edge surface weld, a tensile strength of above about 95,000 pounds per square inch in a heat-treated condition, a yield point in the heat-treated condition of above about 70% of the tensile strength, a ductility of about 25% elongation in 2" and containing between about .35% and about .45% of carbon, between about 1.30% and 1.70% of manganese, between about .015% and about .020% of phosphorous and substantially no silicon.

13. A ferrous metal pipe having a longitudinal resistance butt weld, a yield point in excess of about 70% of the tensile strength, a ductility of above about 25% in 2" and containing between about .18% and about .45% of carbon, between about .80% and about 1.70% manganese, between about .015% and about .020% of phosphorous and substantially no silicon.

14. A ferrous metal pipe having a longitudinal edge surface weld, a yield point in excess of about 80% of the tensile strength, a ductility of about 35% elongation in 2" and containing between about .18% and about .24% of carbon, between about .80% and about 1.30% of manganese, between about .015 and about .020% of phosphorous and substantially no silicon.

15. A ferrous metal pipe having a longitudinal edge surface weld, a yield point in the heat-treated condition of about 70% of the tensile strength, a ductility of above about 25% elongation in 2" and containing between about .35% and about .45% of carbon, between about 1.30% and about 1.70% of manganese, between about .015% and about .020% of phosphorous and substantially no silicon.

16. A ferrous metal pipe having a longitudinal resistance butt weld, a yield point in excess of about 70 of the tensile strength, a ductility of above about 25% in 2" and containing between about .18% and about .45% of carbon, between about .80% and about 1.70% of manganese, between about .015 and about .020% of phosphorous, about .50% of copper and substantially no silicon.

17. A ferrous metal pipe having a longitudinal electric butt weld, a tensile strength in excess of about 75,000 pounds per square inch of metal and containing between about .10% and .45% of carbon, between about .70% and about 1.70% of manganese, between about .015% and about .020% phosphorous, between about .50% and about 1.05% copper and substantially no silicon.

18. A ferrous metal pipe having longitudinal electric butt weld, a tensile strength above about 75,000 pounds per square inch of metal, a yield point of above about 45,000 pounds per square inch of metal, and an elongation of above about 25% in two inches and containing between about .10% and about .45% of carbon, between about .70% and about .90% of manganese, between about .70% and about .90% of copper, between about .015% and about .020% of phosphorous and substantially no silicon.

19. A ferrous metal pipe having longitudinal electric butt weld, a tensile strength between about 85,000 pounds and about 100,000 pounds per square inch of metal, a yield point between about 65,000 and 80,000 pounds per square inch of metal, an elongation above about 30% in 2 inches, and containing between about .18% and about .24% of carbon, between about .90% and about 1.10% of manganese, between about .95% and about 1.05% of copper, between about .015% and about .020% of phosphorous and substantially no silicon.

20. A ferrous metal pipe having longitudinal electric resistance butt weld, a tensile strength in excess of about 75,000 pounds per square inch of metal and containing between about .10% and .45% of carbon, between about .70% and about 1.70% of manganese, between about .015% and about .020% phosphorous, between about .50% and about 1.05% copper and substantially no silicon.

21. The method of making ferrous metal pipe which includes the steps of forming flat ferrous metal into a pipe blank having a slightly oval cross sectional shape whose major axis is in line with the longitudinal seam and having a longitudinal seam defined by edge surfaces contacting at a point remote from their inner radial ends and diverging therefrom to such inner ends at a small included angle, and applying welding pressure and heat to the blank to unite the seam edges progressively from the point of initial contact of the edge surfaces with each other to their remote ends with a substantially uniform and continuous edge surface weld.

22. The method of making ferrous metal pipe which includes the steps of forming flat high tensile steel into a pipe blank having a longitudinal seam defined by edge surfaces contacting at a point at or near to the outer surface of the pipe and diverging therefrom to their inner radial ends at a small included angle and having a slightly oval cross-sectional shape with the major axis in line with the seam, and applying welding pressure and current to the blank to unite the seam edges progressively from the point of initial contact of the edge surfaces with each other to their remote ends with an edge surface weld.

23. The method of making ferrous metal pipe which includes the steps of forming flat ferrous metal into a pipe blank having a longitudinal seam gap and an oval cross-section with its major axis in line with the seam gap, working in successive stages, portions of the surfaces of the opposed seam edges of such blank into substantial parallelism with each other, shortening the major axis slightly and bringing the edge surfaces into contact at a point while maintaining a small clearance between the surfaces at their inner radial ends, and applying welding pressure and current to the blank while so shaped to weld the entire radial length of the edges together with an edge surface weld.

24. The method of making ferrous metal pipe, which includes the step of forming flat ferrous metal into a pipe blank having a longitudinal seam gap and an oval cross-sectional shape with its major axis in line with the seam gap, working the opposed edge surfaces of such blank into substantial parallelism with each other for their full radial lengths, shortening the major axis slightly and bringing the edge surfaces into contact with each other at a point at or near to their outer radial extremities while maintaining a small clearance between said surfaces at their inner radial extremities, and applying welding pressure and current to the blank while so shaped to weld the entire length of the seam edge together with an edge surface weld.

25. The method of making ferrous metal pipe, which includes the steps of forming flat ferrous metal into a pipe blank having a longitudinal seam gap, shaping the blank into an oval cross-sectional shape with the major axis in line with the seam gap and slightly exceeding the length of the minor axis, shaping parts of the surfaces of the opposed seam edges into substantial parallelism while the blank is maintained in said oval shape, shortening the major axis slightly and changing the blank into a more nearly circular form with the seam edges in contact with each other at a point and diverging therefrom to form a small space therebetween at their inner ends, and applying welding pressure and current to the pipe blank to weld the seam edges together for their full radial length with an edge surface weld.

26. The method of making ferrous metal pipe, which includes the steps of forming flat ferrous metal into a pipe blank having a longitudinal seam gap, shaping the blank into an oval cross-sectional shape with its major axis in line with the seam gap, working the surfaces of the proposed seam edges into substantial parallelism and upsetting the metal blank of the said surfaces while the blank is maintained in said oval shape, then shaping the blank into nearly circular form by shortening the major axis slightly and bringing the edge surfaces together at a point at or near to their outer radial extremities, thereby inclining the edge surfaces to each other to form a small space between their inner radial ends, applying welding pressure and current to the blank to weld the edges together for their full radial length with an edge surface weld, and removing the hot welding flash and the upset metal adjacent thereto to form a smooth surface across the weld.

27. The method of making pipe which includes the steps of forming flat ferrous metal into a pipe blank having a longitudinal seam gap, shaping the blank into an oval cross-sectional shape with the major axis in line with the seam gap, cold working the surfaces and the seam edges into substantial parallelism, shortening the major axis by bringing the edge surfaces into contact at a point with said surfaces diverging therefrom to their inner radial ends at an included angle of not more than 14°, subjecting such blank to welding current to the outer surface of the pipe over areas encompassing the ends of a line tangent to the inner surface of the pipe at the seam to unite the edges with an edge surface weld.

28. The method of making ferrous metal pipe which includes the steps of forming flat ferrous metal into a tubular pipe blank, having longitudinal seam edges spaced apart a small distance and an oval cross-sectional shape with the major axis passing between the seam edges and slightly exceeding the length of the minor axis, working the surfaces of the seam edges of such blank to provide a narrow V-shaped space therebetween, with the open end of the V at the inner surface of the blank when the major axis is shortened slightly and the edge surfaces are in contact at the point of the V, and applying welding current and pressure to such blank to weld the edges together for their full radial length with an edge surface weld.

29. The method of making ferrous metal pipe which includes the steps of forming flat ferrous metal into a tubular pipe blank having longitudinal seam edges spaced apart a small distance and an oval cross-sectional shape with the major axis passing between the seam edges and slightly exceeding the length of the minor axis, working the surfaces of said edges of such blank to provide therebetween a V-shaped space with an included angle up to about 14° when the edge surfaces are in contact at the point of the V and the major axis of the pipe is shortened slightly, and applying welding pressure and temperature to the pipe to unite the edges together for their full radial length with an edge surface weld.

30. The method of making ferrous metal pipe which includes the step of forming flat ferrous metal into a tubular pipe having longitudinal seam edges spaced apart a small distance and an oval cross-sectional shape with the major axis passing between the seam edges and slightly exceeding the length of the minor axis, working the thus spaced edge surfaces of such blank to provide a narrow V-shaped space therebetween with the open end of the V at the inner surface of the blank being a few thousandths of an inch wide when the edges are in contact at the point of the V and the major axis is shortened slightly, and applying welding pressure and temperature to such blank to unite the edges together for their full radial length with an edge surface weld.

31. The method of making ferrous metal pipe, which includes the steps of hot rolling into flat form a steel killed with aluminum, forming the rolled metal into tubular pipe blanks having longitudinal seam edges spaced apart from each other a small distance and having an oval cross-sectional shape with the major axis in line with the seam gap and slightly exceeding the length of the minor axis, shaping the surfaces of the seam edges into substantial parallelism while the blank is in such oval shape, then shortening the major axis slightly and bringing the blank into a nearly circular shape with the edge surfaces contacting at a point and forming therebetween a wedge-shaped space with the greatest width thereof being at the inner surface of the blank and not exceeding a few thousandths of an inch, and applying welding pressure and current to the blank to unite the edges for their full radial length with an edge surface weld.

32. A method of making high tensile steel pipe, which includes the steps of substantially killing with aluminum molten metal containing between about .18% and about .45% of carbon, between about .80% and about 1.70% manganese, between about .015% and about .020% of phosphorous and substantially no silicon, hot rolling such killed metal into flat plates or strip and then shaping the rolled metal into tubular form with longitudinal seam edges and with the axis through the seam edges being slightly greater than the axis at right angles thereto and with the seam edges in contact and defining a small included angle open at the inner radial end of the seam, and applying welding pressure and current to the tubular blank to unite the seam edges together for their full radial length with an edge surface weld.

33. The method of making high tensile steel pipe, which includes the steps of substantially killing with aluminum molten metal containing between about .18% and about .45% of carbon, between about .80% and about 1.70% of manganese, between about .015% and about .020% of phosphorous and substantially no silicon, hot rolling such killed metal into flat plates or strips and shaping the rolled metal into a tubular pipe blank with longitudinal seam edges spaced apart from each other a small distance and with an oval cross-sectional shape having its major axis lying between the spaced seam edges and slightly exceeding the length of the minor axis, working portions of the surfaces of the seam edges of such blank into substantial parallelism, shortening the major axis slightly and bringing the edge surfaces together at a point while maintaining a small definite clearance between the surfaces at their inner radial ends, and applying welding pressure and current to such blank to unite the edges with each other for their full radial length with an edge surface weld.

34. The method of making ferrous metal pipe which includes the steps of forming flat ferrous metal into a pipe blank having a longitudinal seam gap and an oval cross section with its major axis in line with the seam gap, working in successive stages portions of the surface of the opposed seam edges of such blank into substantial parallelism with each other, shortening the major axis slightly and bringing the edge surfaces into contact at a point while maintaining a small clearance between the surfaces at their inner radial ends and applying welding pressure and current to the blank while so shaped to weld the entire radial length of the edges together with an edge surface weld.

35. A method of making ferrous metal pipe which includes the steps of forming flat ferrous metal into a pipe blank having a longitudinal seam gap, shaping the blank into an oval cross-sectional shape with its major axis in line with the seam gap, working the surfaces of the opposed seam edges into substantial parallelism and upsetting and thickening the metal at the edges and adjacent portions, shortening the major axis and bringing the seam edges into contact with each other near their outer ends with a small included angle between their said edges, which is open at their inner ends.

GEORGE G. WALKER.